(12) United States Patent
Shiokawa et al.

(10) Patent No.: US 10,224,160 B2
(45) Date of Patent: Mar. 5, 2019

(54) DIMMER SWITCH

(71) Applicant: HONDA MOTOR CO., LTD., Tokyo (JP)

(72) Inventors: Tatsuya Shiokawa, Wako (JP); Masayuki Uzaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 422 days.

(21) Appl. No.: 14/470,940

(22) Filed: Aug. 28, 2014

(65) Prior Publication Data

US 2015/0090577 A1    Apr. 2, 2015

(30) Foreign Application Priority Data

Sep. 27, 2013  (JP) ................................. 2013-202526

(51) Int. Cl.
| | |
|---|---|
| *H01H 19/08* | (2006.01) |
| *H01H 19/14* | (2006.01) |
| *H01H 19/46* | (2006.01) |
| *B60Q 1/14* | (2006.01) |

(52) U.S. Cl.
CPC .......... *H01H 19/08* (2013.01); *B60Q 1/1461* (2013.01); *H01H 19/14* (2013.01); *H01H 19/46* (2013.01); *H01H 2217/048* (2013.01); *H01H 2221/01* (2013.01); *H01H 2231/026* (2013.01); *H01H 2231/052* (2013.01)

(58) Field of Classification Search
CPC ........ H01H 19/08; H01H 19/10; H01H 19/14; H01H 19/46

USPC ............ 200/336, 564, 565, 570, 571, 61.27; 362/459, 460, 463–465, 487–489
See application file for complete search history.

(56) References Cited

U.S. PATENT DOCUMENTS

| | | | | |
|---|---|---|---|---|
| 5,491,311 A | * | 2/1996 | Muscat ................ | H01H 19/635 200/4 |
| 6,774,323 B2 | * | 8/2004 | Ohashi ................ | B60Q 1/1476 180/333 |
| 7,485,985 B2 | * | 2/2009 | Hagberg ............. | B60Q 1/0076 200/179 |
| 7,595,456 B2 | * | 9/2009 | Fukui .................. | B60Q 1/1476 200/4 |

FOREIGN PATENT DOCUMENTS

JP         2006-278273        10/2006

* cited by examiner

*Primary Examiner* — Edwin A. Leon
*Assistant Examiner* — Lheiren Mae A Caroc
(74) *Attorney, Agent, or Firm* — Mori & Ward, LLP

(57) ABSTRACT

A dimmer switch includes a main body and an operation portion. The operation portion is provided in the main body to be rotatable around a rotation axis to switch the dimmer switch among an off position, a low beam position, and a high beam position. The low beam position and the high beam position are provided above a horizontal line passing through the rotation axis and the off position is provided below the horizontal line in a state where the dimmer switch is attached to a vehicle body. A first rotation angle between the off position and the low beam position is set to be larger than a second rotation angle between the low beam position and the high beam position.

20 Claims, 7 Drawing Sheets

DIMMER SWITCH

CROSS-REFERENCE TO RELATED APPLICATIONS

The present application claims priority under 35 U.S.C. § 119 to Japanese Patent Application No. 2013-202526, filed Sep. 27, 2013, entitled "Dimmer Switch." The contents of this application are incorporated herein by reference in their entirety.

BACKGROUND OF THE INVENTION

Field of the Invention

The present invention relates to a dimmer switch.

Discussion of the Background

Conventionally, in vehicles such as an MUV (multi utility vehicle) mainly used in private grounds for recreation or farm work, there is known a dedicated headlight switch (dimmer switch) for facilitating the driver's operation even when traveling in a rough terrain or the like.

Japanese Patent Application Publication No. 2006-278273 discloses a dimmer switch capable of switching among three headlight positions, which are off, low beam, and high beam, by a dial type operation portion provided in the vicinity of a rotational axis of a steering wheel of an MUV and projecting outward in the vehicle width direction.

SUMMARY OF THE INVENTION

According to one aspect of the present invention, a dimmer switch is capable of switching among off, low beam, and high beam by a rotary operation of an operation portion provided in a main body portion. When attached to a vehicle body, the dimmer switch has a low beam position and a high beam position arranged above a horizontal line passing through a rotation axis of the operation portion, as well as has an off position arranged below the horizontal line. A first rotation angle between the off position and the low beam position is set to be larger than a second rotation angle between the low beam position and the high beam position.

According to another aspect of the present invention, a dimmer switch includes a main body and an operation portion. The operation portion is provided in the main body to be rotatable around a rotation axis to switch the dimmer switch among an off position, a low beam position, and a high beam position. The low beam position and the high beam position are provided above a horizontal line passing through the rotation axis and the off position is provided below the horizontal line in a state where the dimmer switch is attached to a vehicle body. A first rotation angle between the off position and the low beam position is set to be larger than a second rotation angle between the low beam position and the high beam position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
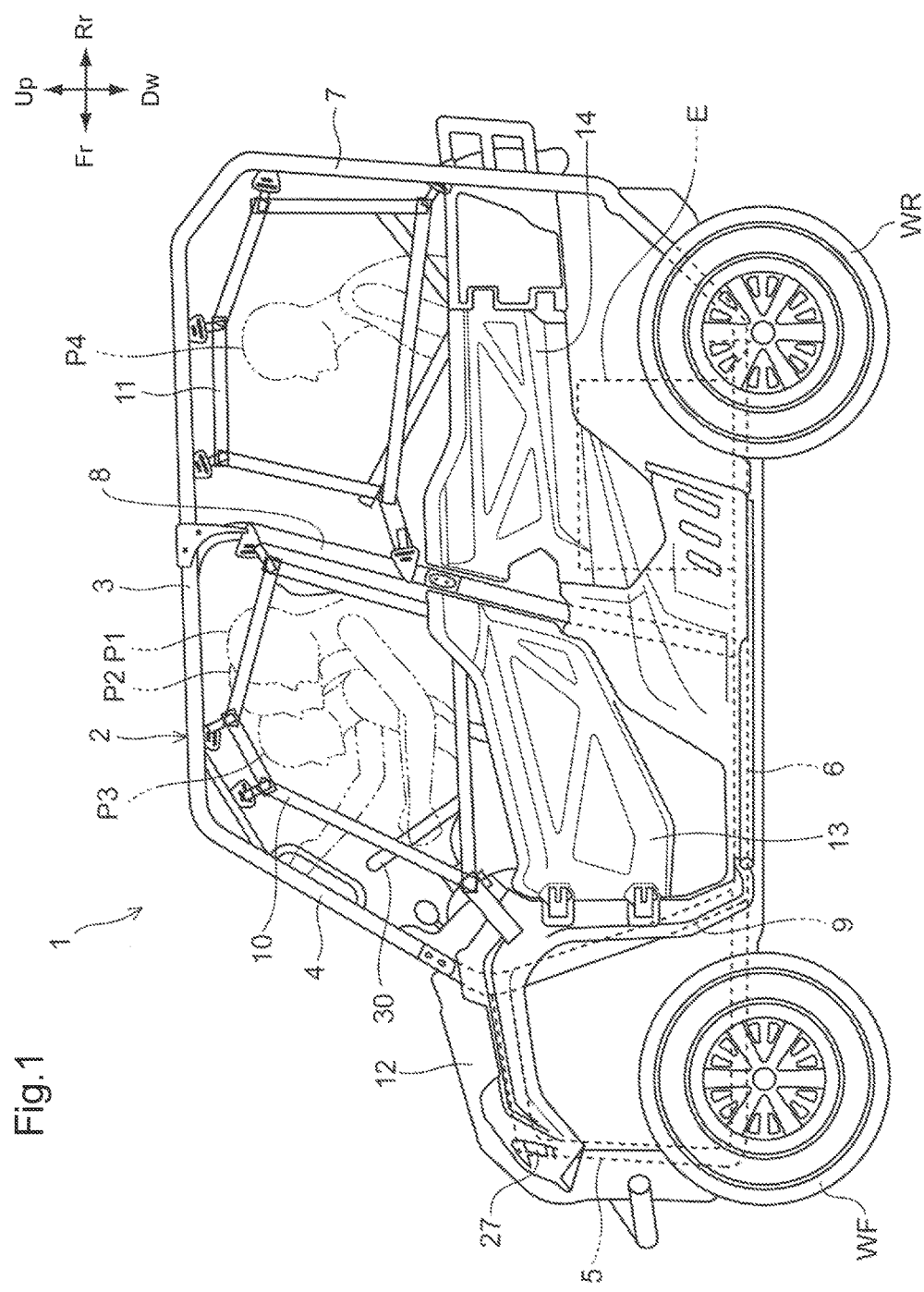
FIG. 1 is a left side view of an MUV to which a dimmer switch according to an embodiment of the present invention is applied.

The embodiments will now be described with reference to the accompanying drawings, wherein like reference numerals designate corresponding or identical elements throughout the various drawings.

Figure 2:
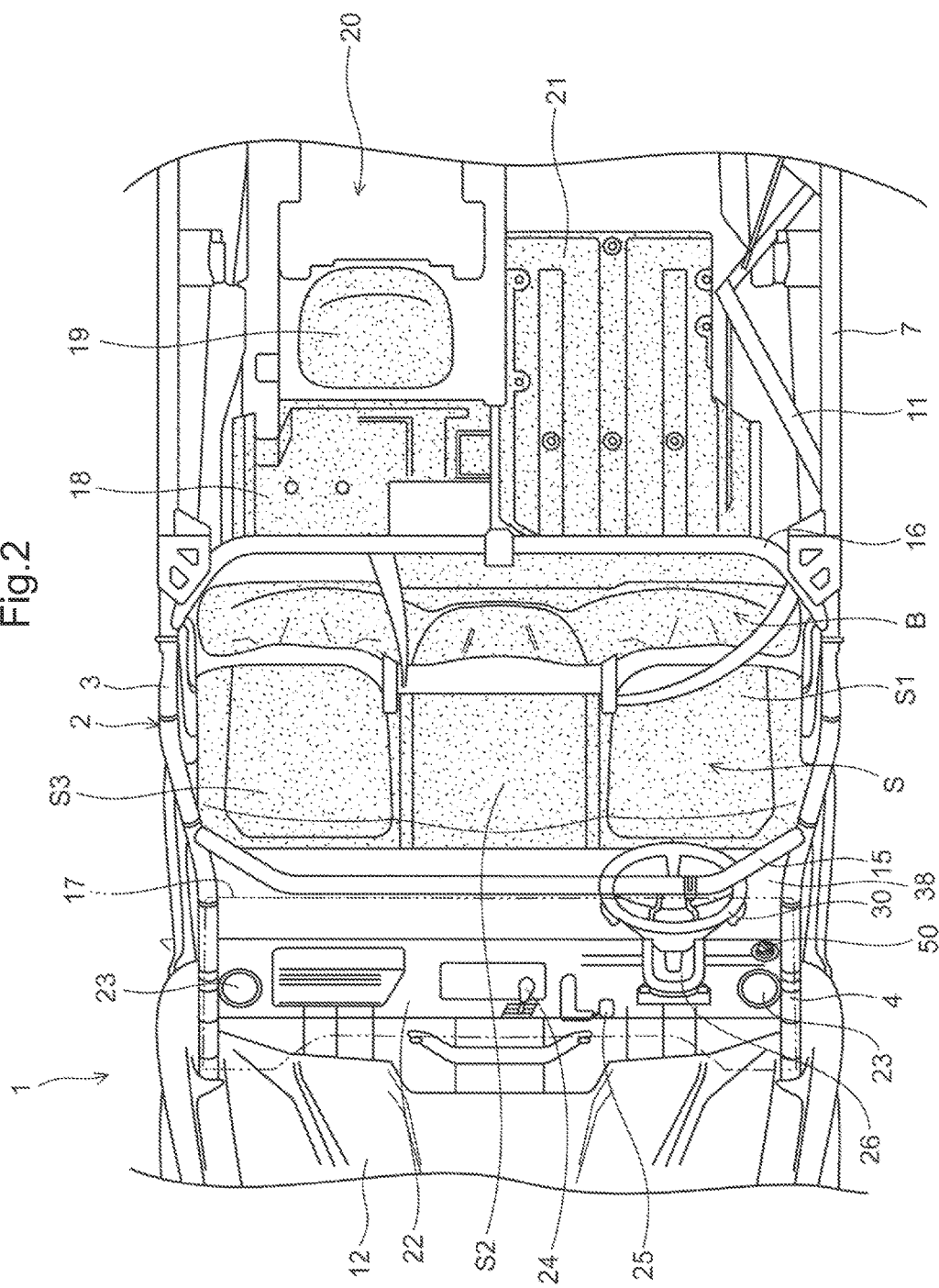
FIG. 2 is an enlarged top view of a part of the MUV.

Hereinafter, a detailed description is given of an embodiment of the present invention with reference to the drawings. FIG. 1 is a left side view of an MUV (multi utility vehicle) 1 to which the embodiment of the present invention is applied. FIG. 2 is an enlarged top view of a part of the MUV 1.

The MUV 1 is a multi-purpose automobile in which paired left and right front wheels WF and rear wheels WR are axially supported in a rotatable manner to a body frame 2, and which runs by supplying drive force to the rear wheels or both of the front and rear wheels by an engine E, arranged in a lower portion closer to the vehicle rear. The MUV 1 is capable of carrying three passengers (P1, P2, P3) including a driver P1 at the front, and two passengers (FIG. 1 shows only a passenger P4 on the left side at the rear) using an auxiliary seat at the rear.

A main frame 9 supporting the vehicle center, an under frame 6 connected to lower portions of the mainframe 9 and extending toward the vehicle rear, and a front frame 5 supporting the front wheel WF side are provided in a lower portion of the body frame 2. The engine E, a differential gear of the rear wheels WR, and other components are supported to the rear side of the under frame 6.

A roll bar that surrounds the passengers from above is formed on the upper side of the body frame 2 by combining: column members 4, 7, 8 disposed in the vertical direction of the body; an upper frame 3 disposed in the longitudinal direction of the body; and connecting pipes 15, 16 disposed in the vehicle width direction and connecting the column members 4, 7, 8 on left and right sides. Paired left and right front doors 13 opened and closed around a hinge mechanism on the vehicle front side are provided on the left and right of the front passengers in the vehicle width direction, and similar rear doors 14 are provided on the left and right of the rear passenger in the vehicle width direction: Side belts 10, 11 are stretched across spaces between the front doors 13 and the roll bar and between the rear doors 14 and the roll bar in a polygonal shape, so as to narrow the openings beside the passengers. Branches, stones or the like can be prevented from entering the vehicle, or luggage can be prevented from falling out of the vehicle, for example, by stretching a net member across the portions surrounded by the side belts 10, 11.

A steering wheel 30 for steering the front wheels WF is provided in front of the driver P1, who is seated closer to the left in the vehicle width direction. In addition, a front cover 12 is provided in front of the steering wheel 30 and in front of the column member 4. Headlights 27 paired with each other in the vehicle width direction are arranged at positions on the front end of the front cover 12.

Referring to FIG. 2, a front seat S is configured such that a center seat S2 and a right seat S3 are arranged side by side on the right side of S1 on which the driver sits, and an integrated seat back B for the three seats is arranged behind the front seat S. A seating portion 18 collapsible toward the vehicle front and a small seat back 19 are arranged in a right position of the rear seat. Meanwhile, a large collapsible seat back 21 is arranged in a left position of the rear seat, the seat back configured such that when there is no passenger seated thereon, a top face of the collapsible seat back 21 collapsed frontward can be used as a floor face of a luggage compartment 20.

A screen 17 made of a clear acrylic plate or the like is attached between the column members 4 in front of the steering wheel 30. An instrument panel 22 on which various switches and meter devices, storage compartments and the like are arranged is provided in a lower portion behind the screen 17. The steering wheel 30 is arranged on a rear end portion of a handle post 26 provided in a standing manner on the instrument panel 22. A floor 38 including an unillustrated acceleration pedal and break pedal is formed on the vehicle lower side of the instrument panel 22.

A gear shift lever 25 of an automatic transmission and a switch lever 24 for switching between two-wheel drive and four-wheel drive are arranged on the instrument panel 22 on the right side of the handle post 26 in the vehicle width direction. Meanwhile, a dimmer switch 50 for switching among turning off of the headlights 27, lighting of low beam, and lighting of high beam is arranged on the left side of the handle post 26 in the vehicle width direction. Additionally, cup holders 23 paired with each other in the vehicle width direction are provided in the vehicle upper side of the dimmer switch 50.

Figure 3:
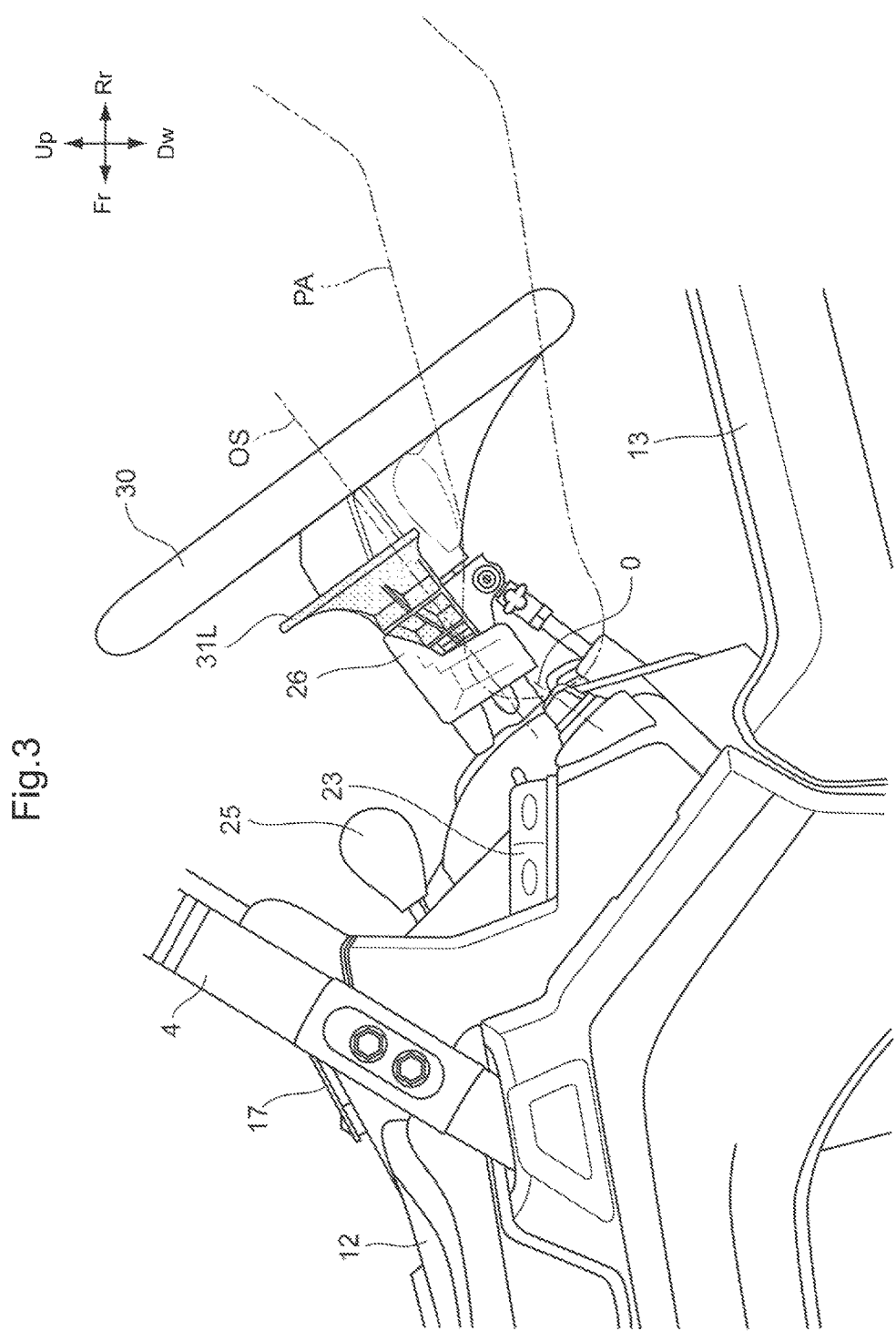
FIG. 3 is an enlarged left side view of a part of the MUV.
Figure 4:
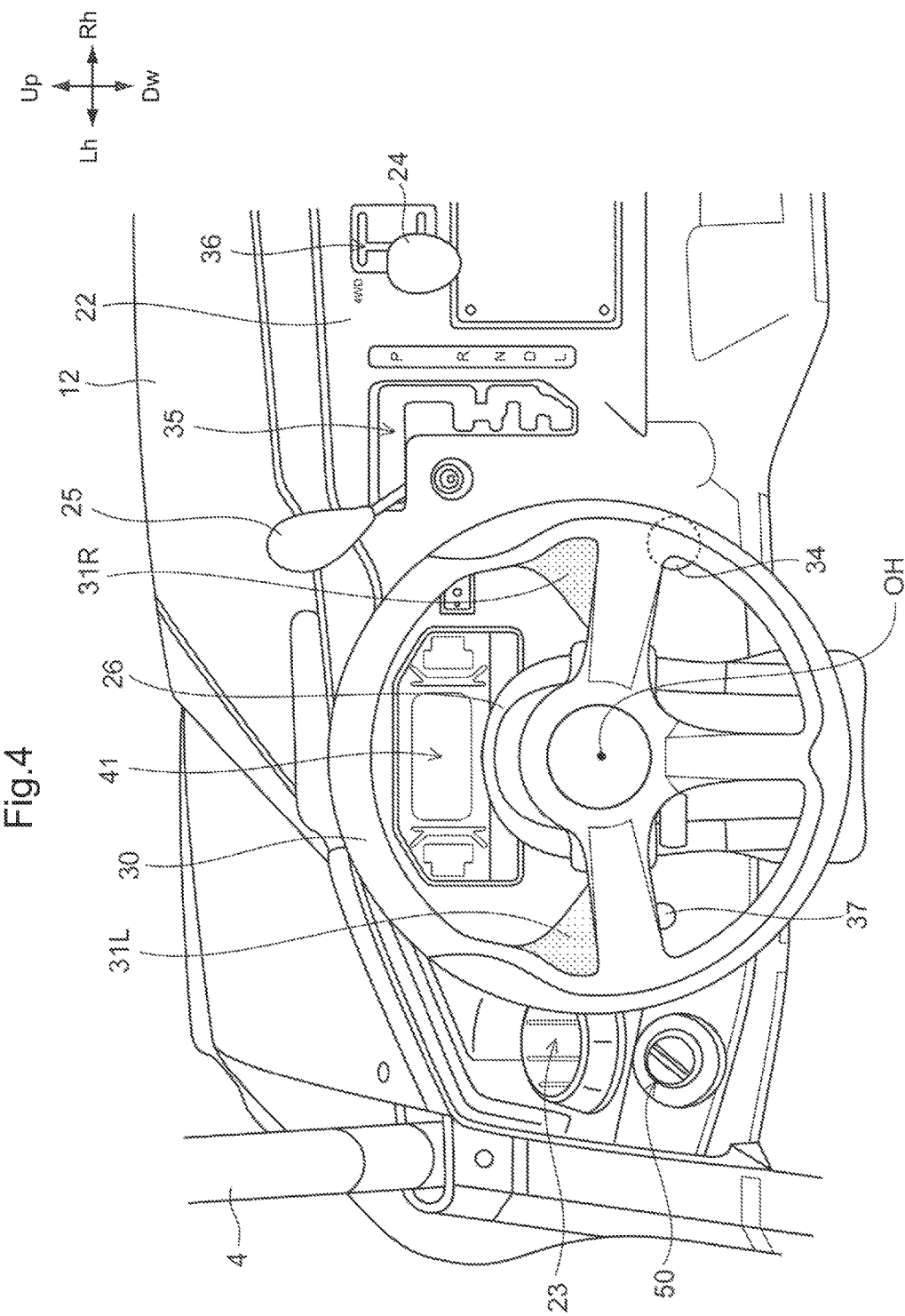
FIG. 4 is an explanatory drawing of a configuration of the periphery of a steering wheel as seen from an axial direction of the steering wheel.
Figure 5:
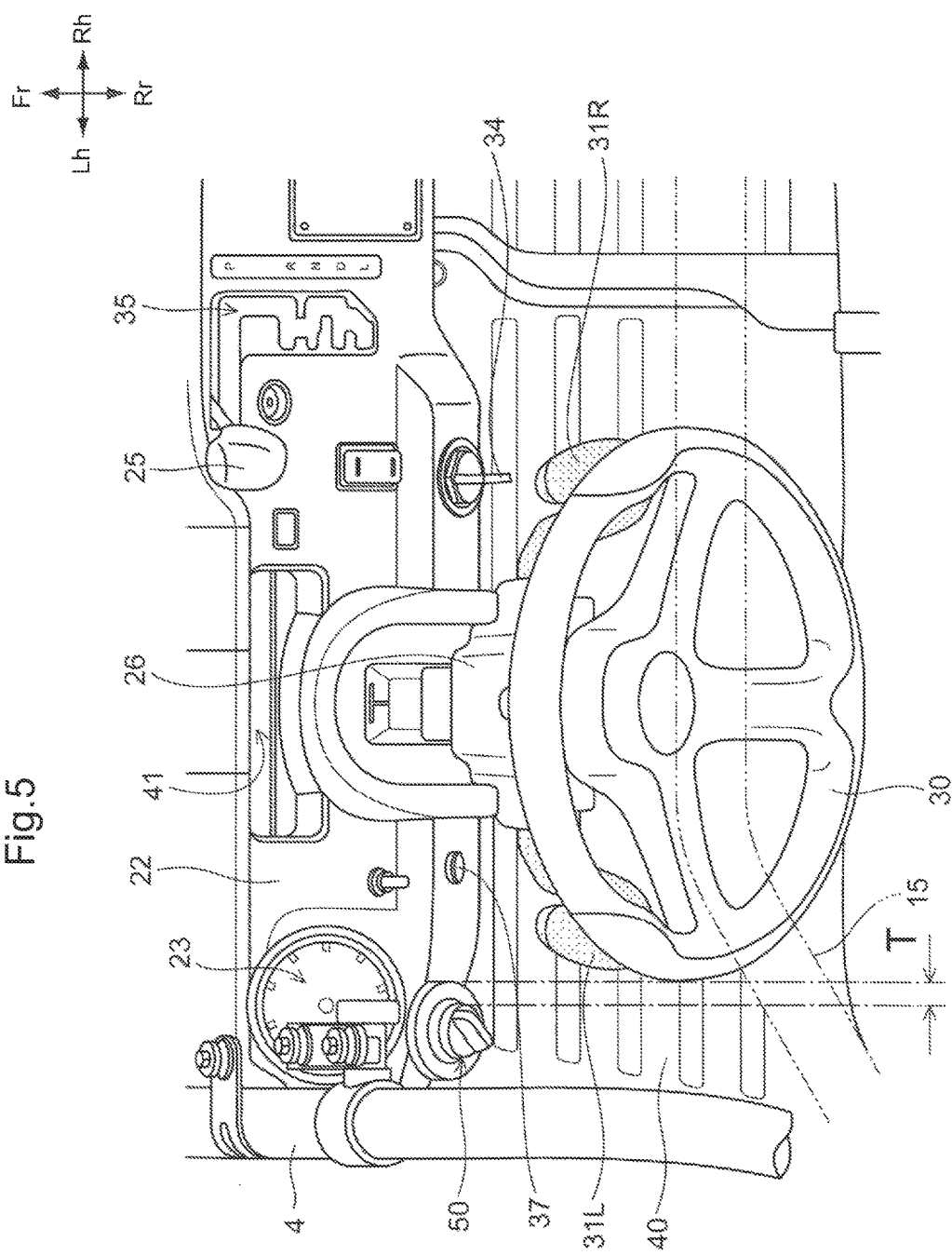
FIG. 5 is an explanatory drawing of the configuration of the periphery of the steering wheel as seen from the vehicle upper side.
Figure 6:
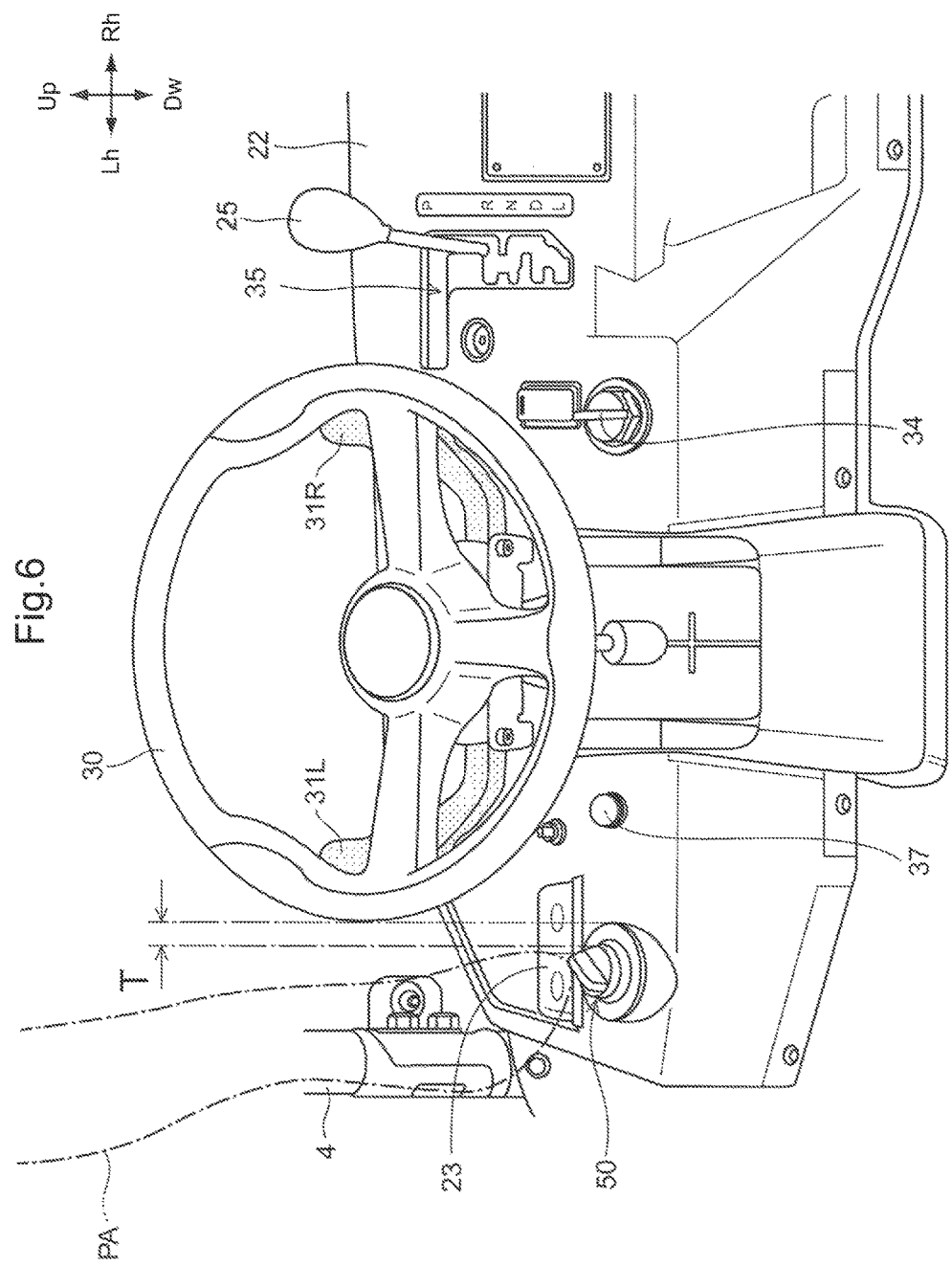
FIG. 6 is an explanatory drawing of the configuration of the periphery of the steering wheel as seen from the vehicle lower side.

FIG. 3 is an enlarged left side view of a part of the MUV 1. FIG. 4 is an explanatory drawing of a configuration of the periphery of the steering wheel 30 as seen from an axial direction of the steering wheel 30. FIG. 5 is an explanatory drawing of the configuration of the periphery of the steering wheel 30 as seen from the vehicle upper side. FIG. 6 is an explanatory drawing of the configuration of the periphery of the steering wheel 30 as seen from the vehicle lower side.

As described earlier, the dimmer switch 50 is a switch for switching among turning off of the headlights 27, lighting of low beam, and lighting of high beam by a rotary operation of the dial type operation portion in one or the other direction, and is attached to the instrument panel 22 on the left side of the handle post 26 in the vehicle width direction. In addition, the dimmer switch 50 is positioned on the lower side of the vehicle body than a rotation axis OS of the steering wheel 30. In side view of the vehicle body, the upward and rearward inclination of a rotation axis O of the operation portion of the dimmer switch 50 is set steeper than that of the rotation axis OS of the steering wheel 30. The driver P1 of the MUV 1 operates the dimmer switch 50 by extending his/her left arm PA frontward from the left side of the steering wheel 30.

A meter device 41 including a speedometer, a fuel gauge, and various indicators is arranged on the instrument panel 22 above the handle post 26. The gear shift lever 25 movable among P (parking), R (reverse), N (neutral), D (drive), and L (low) positions along a gate 35 being a groove provided on the instrument panel 22, is arranged on the right side of the meter device 41 in the vehicle width direction. Moreover, the switch lever 24 movable between two-wheel drive and four-wheel drive positions along a gate 36 is arranged on the right side of the gear shift lever 25.

Shift paddles 31L, 31R are provided on the back side of the steering wheel 30, the driver operating the shift paddles by pulling them to the near side with his/her fingers while keeping the thumbs hooked on the steering wheel 30. The shift paddles 31L, 31R attached so as to be swingable with respect to the handle post 26 are plate controllers configured to optionally switch the gear position when the gear shift lever 25 is in the D position. In this embodiment, the right shift paddle functions as a shift-up lever, and the left shift paddle functions as a shift-down lever.

A horn switch 37 is arranged between the handle post 26 and dimmer switch 50 in a lower portion in front of the left shift paddle 31L. Meanwhile, a main switch 34 into which a portable key is inserted for rotary operation is arranged in a lower position in front of the right shift paddle 31R. Note that the cup holder 23 positioned above the dimmer switch 50 is arranged such that its bottom face is disposed substantially horizontally.

Referring to FIGS. 5 and 6, the dimmer switch 50 is arranged such that its dial type operation portion faces the driver, and in a position spaced apart from a left end portion of the outer diameter of the steering wheel 30 for a distance T to the left side in the vehicle width direction. In other words, the dimmer switch 50 is arranged such that an outer diameter portion of its operation portion 51 and an outer diameter portion of the steering wheel 30 do not overlap each other in the vehicle width direction. With this configuration, the left hand PA of the driver is less likely to interfere with the steering wheel 30 even when he/she operates the dimmer switch 50 by taking the left hand PA off the steering wheel 30 and extending it frontward. Hence, operability of the dimmer switch 50 is improved.

Additionally, since the dimmer switch 50 is arranged closer to the driver than the cup holder 23 or horn switch 37 and below the rotation axis OS of the steering wheel 30, it can be easily reached by the left hand even when the MUV 1 is inclined steeply or vibrates frequently.

Figure 7:
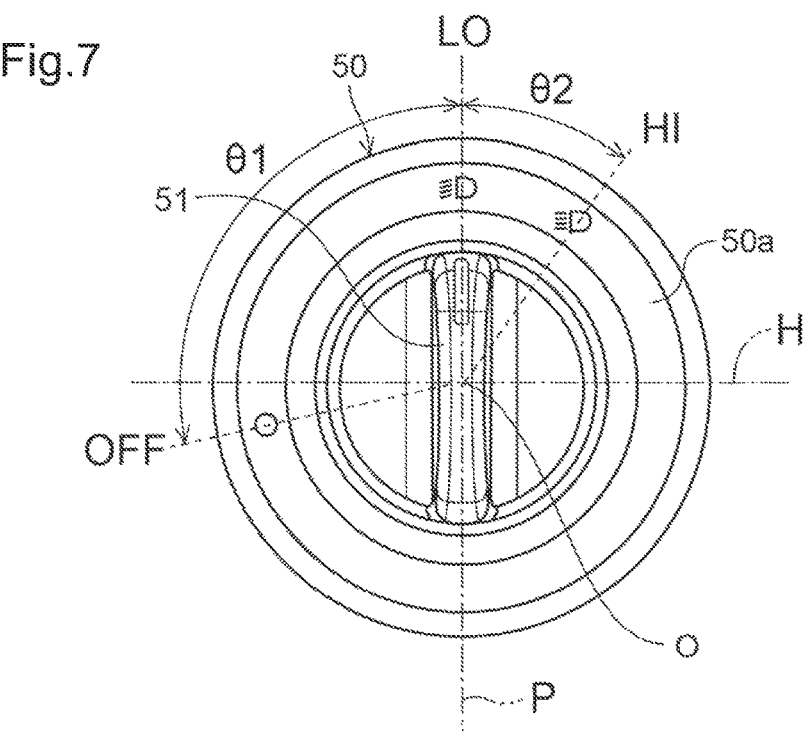
FIG. 7 is a front view of the dimmer switch.
Figure 8:
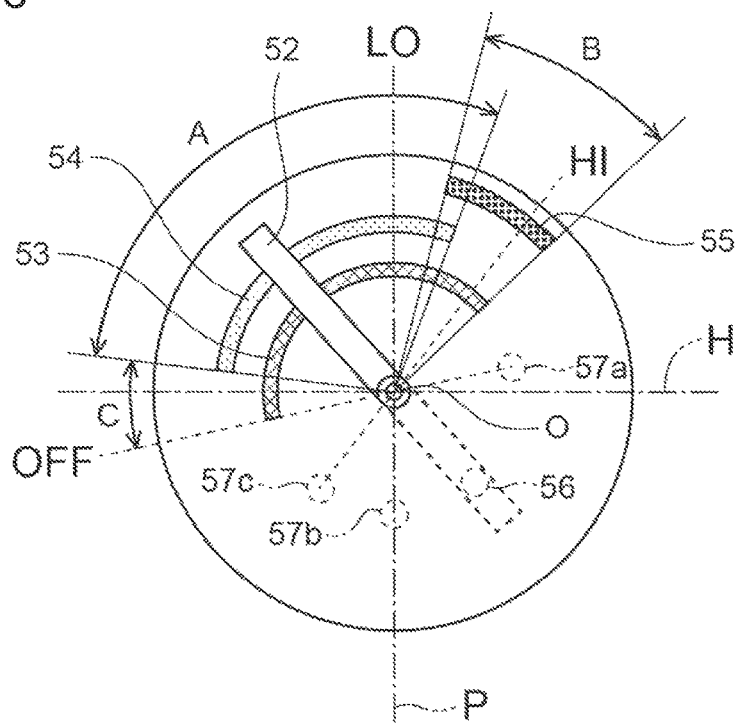
FIG. 8 is an explanatory drawing of a contact point structure of the dimmer switch.

FIG. 7 is a front view of the dimmer switch 50. FIG. 8 is an explanatory drawing of a contact point structure of the dimmer switch 50. The dimmer switch 50 is configured such that an operation portion 51 circular in front view with a thick plate-knob attached thereto, is axially supported in a rotatable manner to the center of a main body portion 50a buried in the instrument panel 22. The rotation range of the operation portion 51 is set between an off position (OFF) and high beam position (HI), where a low beam position (LO) is provided therebetween. Accordingly, the dimmer switch 50 can switch among OFF, LO, and HI in this order by a clockwise rotary operation of the operation portion 51, and among HI, LO, and OFF in this order by a counterclockwise rotary operation of the operation portion 51.

In this embodiment, LO and HI are provided on the upper side of a horizontal line H passing through the rotation axis O of the operation portion 51, and OFF is provided on the lower side of the horizontal line (H). In addition, while setting LO on a line (P) perpendicular to the horizontal line (H), a first rotation angle θ1 between OFF and LO is set to an obtuse angle (such as 100 degrees), and a second rotation angle θ2 between LO and HI is set to an acute angle (such as 40 degrees). By setting the rotation angles in this manner, the rotation angle between the off position and the low beam position and that between the low beam position and the high beam position can be differentiated, whereby the dimmer switch 50 of high operability which is less likely to be operated erroneously can be achieved in a simple structure.

Since the dimmer switch 50 whose rotation angles are set in the above manner is provided on the left side of the handle post 26 in the vehicle width direction, the driver is to operate the operation portion 51 with his/her left hand. Hence, the low beam position and high beam position can be switched by moving the wrist slightly with the back of the hand facing upward, whereas the switching from the low beam position to the off position requires an action of flipping the wrist to the outer side of the steering wheel 30 due to the large rotation angle. Thus, the effect of preventing erroneous operation can be enhanced even more.

A positioning mechanism configured of a ball (steel ball) 56 biased by a spring (not shown) and a hemispherical ball receiving-hole is provided in each of the OFF, LO, and HI positions. Specifically, the driver feels a click when he/she dials the operation portion 51 to the respective positions since a ball 56 held on the back side of the operation portion 51 engages with a ball receiving-hole 57a in the off position (OFF), the ball 56 engages with a ball receiving-hole 57b in the low beam position (LO), and the ball 56 engages with a ball receiving-hole 57c in the high beam position (HI). This allows the operation portion 51 to more easily stop at each position, so that operability of the dimmer switch 50 can be improved and erroneous operation can be prevented even more effectively.

The dimmer switch 50 is configured to switch electrical connections by sliding a movable contact point 52 provided in the operation portion 51 along each of arc shaped fixed contact points provided in the main body portion 50a. A common contact point 53, a fixed contact point 54 for low beam, and a fixed contact point 55 for high beam are arranged in this order from the inner circumference side in the main body portion 50a. In FIG. 8, a lighting range of low beam is indicated by an angle A, a lighting range of high beam is indicated by an angle B, and a light off range is indicated by an angle C.

A specific characteristic of this embodiment is that the lighting range of low beam is widened by extending the fixed contact point 54 for low beam to a position closer to OFF. This allows the headlights 27 to not be turned off immediately, even if the operation portion exceeds the low beam position (LO) when switching from high beam to low beam due to vibration or the like during travel. Hence, the dimmer switch is less likely to be operated erroneously even while traveling in a rough terrain.

In addition, the fixed contact point 54 for low beam is extended to a position between the low beam position (LO) and high beam position (HI), as well as is configured to overlap the fixed contact point 55 for high beam in the circumferential direction. This prevents the headlights from being turned off in the course of switching from low beam to high beam, whereby a dimmer switch of high usability can be achieved.

Note that the form of MUV, structure or shape of the dimmer switch, position or angle of attachment to the vehicle body, angles of rotation among the three positions OFF, LO, and HI, structure of the positioning mechanism of the operation portion, and form and the like of the fixed and movable contact points are not limited to the above embodiment, and various changes can be made. For example, the three positions may be flipped left-to-right, and the dimmer switch may be arranged on the right side of the steering wheel. The dimmer switch according to the embodiment of the present invention is not limited to a four-wheeled MUV, and is also applicable to various vehicles whose front wheels are steered by a steering wheel, and various vehicles whose front wheels are steered by a bar handle.

A first characteristic of the embodiment of the present invention is a dimmer switch (50) capable of switching among off, low beam, and high beam by a rotary operation of an operation portion (51) provided in a main body portion (50a), wherein: when attached to a vehicle body, the dimmer switch (50) has a low beam position (LO) and a high beam position (HI) arranged above a horizontal line (H) passing through a rotation axis (O) of the operation portion (51), as well as has an off position (OFF) arranged below the horizontal line (H); and a first rotation angle ($\theta 1$) between the off position (OFF) and the low beam position (LO) is set to be larger than a second rotation angle ($\theta 2$) between the low beam position (LO) and the high beam position (HI).

A second characteristic is that the dimmer switch (50) includes a positioning mechanism (57a, 57b, 57c) configured to hold the position of the operation portion (51) for each of the off position (OFF), the low beam position (LO), and the high beam position (HI).

A third characteristic is that: a movable contact point (52) is arranged in the operation portion (51), while an arc shaped fixed contact point (54) for low beam and an arc shaped fixed contact point (55) for high beam are arranged in the main body portion (50a); the fixed contact point (54) for low beam is arranged so as to extend from a position between the off position (OFF) and the low beam position (LO) to a position between the low beam position (LO) and the high beam position (HI); and the fixed contact point (55) for high beam is arranged so as to extend from a position overlapping an end portion of the fixed contact point (54) for low beam in the circumferential direction to the high beam position (HI).

A fourth characteristic is that the first rotation angle ($\theta 1$) is set to an obtuse angle, while the second rotation angle ($\theta 2$) is set to an acute angle.

A fifth characteristic is that on an instrument panel (22) of a vehicle (1) whose front wheels (WF) are steered by a steering wheel (30), the dimmer switch (50) is attached such that the operation portion (51) faces the driver, and so as to be positioned closer to the outside in the vehicle width direction than an outer diameter portion of the steering wheel (30).

A sixth characteristic is that the dimmer switch is configured such that the operation portion (51) passes through the low beam position (LO) before reaching the high beam position (HI) when it is rotated in one direction from the off position (OFF).

Further, a seventh characteristic is that the dimmer switch (50) is provided on one of left and right sides of the steering wheel (30); and the off position (OFF) is provided on the same side as the one of left and right sides relative to a rotation axis (o) of the dimmer switch (50).

According to the first characteristic, when attached to a vehicle body, the dimmer switch has a low beam position and a high beam position arranged above a horizontal line passing through a rotation axis of the operation portion, as well as has an off position arranged below the horizontal line; and a first rotation angle between the off position and the low beam position is set to be larger than a second rotation angle between the low beam position and the high beam position. Hence, the rotation angle from the off position to the low beam position and that from the low beam position to the high beam position can be differentiated, whereby a dimmer switch of high operability which is less likely to be operated erroneously can be achieved in a simple structure.

According to the second characteristic, the dimmer switch includes a positioning mechanism configured to hold the position of the operation portion for each of the off position, the low beam position, and the high beam position. Hence, a positioning mechanism formed of a ball biased by a spring and a ball receiving-hole may be provided, for example, which allows the operation portion to more easily stop at each position, so that operability can be improved and erroneous operation can be prevented even more effectively.

According to the third characteristic, the fixed contact point for low beam is arranged so as to extend from a position between the off position and the low beam position to a position between the low beam position and the high beam position. As a result, low beam continues to be lit even if the operation portion is rotated for some amount toward the off position from the low beam position. Hence, even if the operation portion exceeds the low beam position when switching from high beam to low beam due to vibration or the like during travel, for example, the headlights are not turned off immediately. Additionally, since the fixed contact points for low beam and for high beam are arranged in an overlapping manner, the headlights are not turned off in the course of switching from low beam to high beam, whereby a dimmer switch of high usability can be achieved.

According to the fourth characteristic, the first rotation angle is set to an obtuse angle, while the second rotation angle is set to an acute angle. Since the difference between the first and second rotation angles is made large, erroneous operation is less likely to occur even if the operator does not look at the dimmer switch. In particular, since the wrist needs to be flipped when switching from the low beam position to the off position, the dimmer switch can be configured so as to be hardly switched to the off position unless the operator operates with a strong intention.

According to the fifth characteristic, on an instrument panel of a vehicle in which front wheels are steered by a steering wheel, the dimmer switch is attached such that the operation portion faces the driver, and so as to be positioned closer to the outside in the vehicle width direction than an outer diameter portion of the steering wheel. Hence, operability can be improved even more by arranging the dimmer switch where the driver can reach out naturally and where the reached out hand does not interfere with the steering wheel.

According to the sixth characteristic, the dimmer switch is configured such that the operation portion passes through the low beam position before reaching the high beam position when it is rotated in one direction from the off position. Hence, it is possible to light low beam from the off state and switch to high beam in a rotary action in one direction. Also, by rotating the operation portion in the direction opposite to the one direction, it is possible to switch from high beam, low beam, and then to the off state in a sequential flow, achieving high operability.

According to the seventh characteristic, the dimmer switch is provided on one of left and right sides of the steering wheel; and the off position is provided on the same side as the one of left and right sides relative to a rotation axis of the dimmer switch. Consequently, the off position of the dimmer switch is positioned on the side spaced apart from the rotation axis of the steering wheel. Hence, the low beam position and the high beam position can be switched by moving the wrist slightly with the back of the hand facing upward, whereas the switching from the low beam position to the off position requires an action of flipping the wrist to the outer side of the steering wheel. Thus, the effect of preventing erroneous operation can be enhanced even more.

Obviously, numerous modifications and variations of the present invention are possible in light of the above teachings. It is therefore to be understood that within the scope of the appended claims, the invention may be practiced otherwise than as specifically described herein.

What is claimed is:

1. A dimmer switch capable of switching among off, low beam, and high beam by a rotary operation of an operation portion provided in a main body portion, wherein:
    when attached to a vehicle body, said dimmer switch has a low beam position and a high beam position arranged above a horizontal line passing through a rotation axis of said operation portion, as well as has an off position arranged below said horizontal line; and
    a first rotation angle between said off position and said low beam position is set to be larger than a second rotation angle between said low beam position and said high beam position,
    wherein said first rotation angle is set to an obtuse angle, while said second rotation angle is set to an acute angle.

2. The dimmer switch according to claim 1, comprising a positioning mechanism configured to hold the position of said operation portion for each of said off position, said low beam position, and said high beam position.

3. The dimmer switch according to claim 1, wherein:
    a movable contact point is arranged in said operation portion, while an arc shaped fixed contact point for low beam and an arc shaped fixed contact point for high beam are arranged in said main body portion;
    said fixed contact point for low beam is arranged so as to extend from a position between said off position and said low beam position to a position between said low beam position and said high beam position; and
    said fixed contact point for high beam is arranged so as to extend from a position overlapping an end portion of said fixed contact point for low beam in the circumferential direction to said high beam position.

4. A vehicle comprising:
    a vehicle body having a vehicle center axis extending in a front-rear direction of the vehicle; and
    a dimmer switch capable of switching among off, low beam, and high beam by a rotary operation of an operation portion provided in a main body portion, wherein:
    when attached to a vehicle body, said dimmer switch has a low beam position and a high beam position arranged above a horizontal line passing through a rotation axis of said operation portion, as well as has an off position arranged below said horizontal line; and
    a first rotation angle between said off position and said low beam position is set to be larger than a second rotation angle between said low beam position and said high beam position,
    wherein on an instrument panel of the vehicle whose front wheels are steered by a steering wheel, said dimmer switch is attached such that said operation portion faces the driver, and so as to be entirely positioned farther from the vehicle center axis in a vehicle width direction than an entirety of said steering wheel is from the vehicle center axis in the vehicle width direction.

5. The dimmer switch according to claim 4, wherein
    the dimmer switch is configured such that said operation portion passes through said low beam position before reaching said high beam position when it is rotated in one direction from said off position.

6. The dimmer switch according to claim 4, wherein:
said dimmer switch is provided on one of left and right sides of said steering wheel; and
said off position is provided on the same side as said one of left and right sides relative to a rotation axis of said dimmer switch.

7. The dimmer switch according to claim 4, wherein the dimmer switch is configured to be positioned in the vehicle body such that the operation portion does not overlap with the outer diameter portion of the steering wheel in the vehicle width direction.

8. A dimmer switch comprising:
a main body; and
an operation portion provided in the main body to be rotatable around a rotation axis to switch the dimmer switch among an off position, a low beam position, and a high beam position, the low beam position and the high beam position being provided above a horizontal line passing through the rotation axis and the off position being provided below the horizontal line in a state where the dimmer switch is attached to a vehicle body, a first rotation angle between the off position and the low beam position being set to be larger than a second rotation angle between the low beam position and the high beam position,
wherein the first rotation angle is set to an obtuse angle, while the second rotation angle is set to an acute angle.

9. The dimmer switch according to claim 8, further comprising a positioning mechanism configured to hold a position of the operation portion for each of the off position, the low beam position, and the high beam position.

10. The dimmer switch according to claim 8, wherein
a movable contact point is provided in the operation portion, while an arc shaped fixed contact point for low beam and an arc shaped fixed contact point for high beam are provided in the main body,
the arc shaped fixed contact point for the low beam is provided so as to extend from a position between the off position and the low beam position to a position between the low beam position and the high beam position, and
the arc shaped fixed contact point for the high beam is provided so as to extend from a position overlapping an end portion of the arc shaped fixed contact point for the low beam in a circumferential direction to the high beam position.

11. The dimmer switch according to claim 8, wherein the dimmer switch is positioned on a lower side of the vehicle body than a rotation axis of a steering wheel provided in the vehicle body.

12. A switch vehicle comprising:
a vehicle body having a vehicle center axis extending in a front-rear direction of the vehicle; and
a dimmer switch comprising:
a main body; and
an operation portion provided in the main body to be rotatable around a rotation axis to switch the dimmer switch among an off position, a low beam position, and a high beam position, the low beam position and the high beam position being provided above a horizontal line passing through the rotation axis and the off position being provided below the horizontal line in a state where the dimmer switch is attached to a vehicle body, a first rotation angle between the off position and the low beam position being set to be larger than a second rotation angle between the low beam position and the high beam position,
wherein on an instrument panel of the vehicle whose front wheels are steered by a steering wheel, the dimmer switch is attached such that the operation portion faces a driver, and so as to be entirely positioned farther from the vehicle center axis in a vehicle width direction than an entirety of the steering wheel is from the vehicle center axis in the vehicle width direction.

13. The dimmer switch according to claim 12, wherein the dimmer switch is configured such that the operation portion passes through the low beam position before reaching the high beam position when the operation portion is rotated in one direction from the off position.

14. The dimmer switch according to claim 12, wherein the dimmer switch is provided on one of left and right sides of the steering wheel, and
the off position is provided on a same side as the one of left and right sides relative to the rotation axis of the dimmer switch.

15. The dimmer switch according to claim 12, wherein the dimmer switch is configured to be positioned in the vehicle body such that the operation portion does not overlap with the outer diameter portion of the steering wheel in the vehicle width direction.

16. A dimmer switch comprising:
a main body; and
an operation portion provided in the main body to be rotatable around a rotation axis to switch the dimmer switch among an off position, a low beam position, and a high beam position, the low beam position and the high beam position being provided above a horizontal line passing through the rotation axis and the off position being provided below the horizontal line in a state where the dimmer switch is attached to a vehicle body, a first rotation angle between the off position and the low beam position being set to be larger than a second rotation angle between the low beam position and the high beam position,
wherein in side view of the vehicle body, an upward and rearward inclination of the rotation axis is set steeper than an upward and rearward inclination of a rotation axis of a steering wheel provided in the vehicle body.

17. A dimmer switch comprising:
a main body; and
an operation portion provided in the main body to be rotatable around a rotation axis to switch the dimmer switch among an off position, a low beam position, and a high beam position, the low beam position and the high beam position being provided above a horizontal line passing through the rotation axis and the off position being provided below the horizontal line in a state where the dimmer switch is attached to a vehicle body, a first rotation angle between the off position and the low beam position being set to be larger than a second rotation angle between the low beam position and the high beam position,
wherein the operation portion does not include a switch position between the low beam position and the high beam position,
wherein the operation portion does not include a switch position between the off position and the low beam position, and
wherein said first rotation angle is set to an obtuse angle, while said second rotation angle is set to an acute angle.

18. A dimmer switch comprising:

a main body; and an operation portion provided in the main body to be rotatable around a rotation axis to switch the dimmer switch among an off position, a first operating position, and a second operating position, the first operating position and the second operating position being provided above a horizontal line passing through the rotation axis and the off position being provided below the horizontal line in a state where the dimmer switch is attached to a vehicle body, wherein the first operating position being a first closest operating position of the operating portion to the off position, the first operating position being provided at a first rotating angle from the off position, wherein the second operating position being a second closest operating position of the operating portion to the first operating position, the second operating position being provided at a second rotating angle from the first operating position, and wherein the first rotation angle is larger than the second rotation angle.

19. The dimmer switch according to claim 18, wherein the first rotation angle is an obtuse angle, and the second rotation angle is an acute angle.

20. The dimmer switch according to claim 19, wherein the first operating position is a low beam position, and the second operating position is a high beam position.

* * * * *